United States Patent [19]

Depew

[11] 4,064,865

[45] Dec. 27, 1977

[54] SOLAR ACTUATED BOILER AND APPURTENANCES

[76] Inventor: Walter L. Depew, 3111 W. 54th Ave., Denver, Colo. 80221

[21] Appl. No.: 572,083

[22] Filed: Apr. 28, 1975

[51] Int. Cl.² .............................................. F24J 3/02
[52] U.S. Cl. .................................. 126/271; 350/292; 350/299
[58] Field of Search ............... 126/270, 271; 237/1 A; 350/292, 293, 299, 294

[56] References Cited

U.S. PATENT DOCUMENTS

| 1,130,871 | 3/1935 | Willsie | 126/271 |
| 1,658,455 | 2/1928 | Metzech et al. | 126/271 |
| 1,855,815 | 4/1932 | Abbot | 126/271 |
| 2,382,722 | 8/1945 | Kezer | 126/271 |
| 2,693,939 | 11/1956 | Marchant et al. | 126/271 |
| 2,920,710 | 1/1960 | Howard | 126/270 |
| 2,969,918 | 1/1961 | Phelps | 126/270 |
| 3,401,682 | 9/1968 | Jakob | 126/400 |
| 3,822,692 | 7/1974 | Demarest | 126/271 |

FOREIGN PATENT DOCUMENTS

| 131,069 | 1/1949 | Australia | 126/270 |
| 555,420 | 3/1923 | France | 126/270 |
| 18,998 of | 1913 | United Kingdom | 126/271 |

*Primary Examiner*—Kenneth W. Sprague
*Assistant Examiner*—James C. Yeung
*Attorney, Agent, or Firm*—O'Rourke & Harris

[57] ABSTRACT

A solar actuated boiler which receives the incident rays of the sun, magnifying them and concentrating them at precise multiple points. This concentration results in an aqueous solution, under pressure, being heated to temperatures resulting in hydrokinetic motion. The heat from this solution will then be convected through a system of piping, deposited and stored in the systems heat storage vault. This stored heat is then convected through a companion system of piping for the purpose of, but not limited to, such uses as heating, domestic hot water, air-conditioning and electrical energy.

10 Claims, 17 Drawing Figures

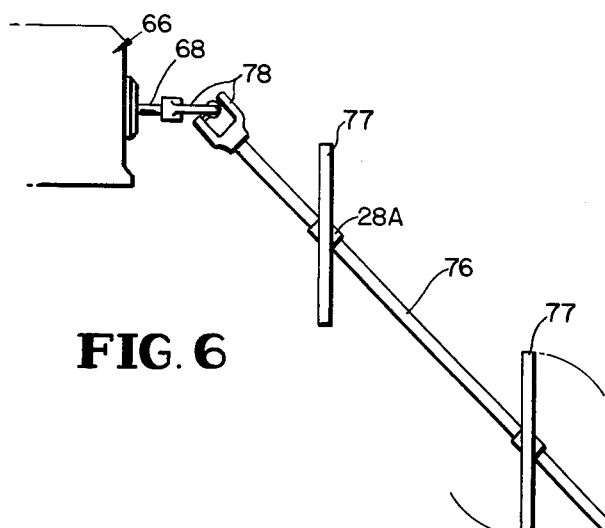
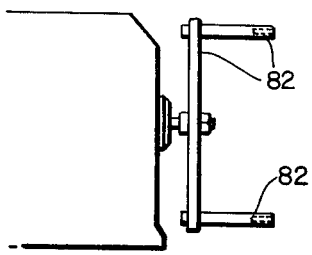
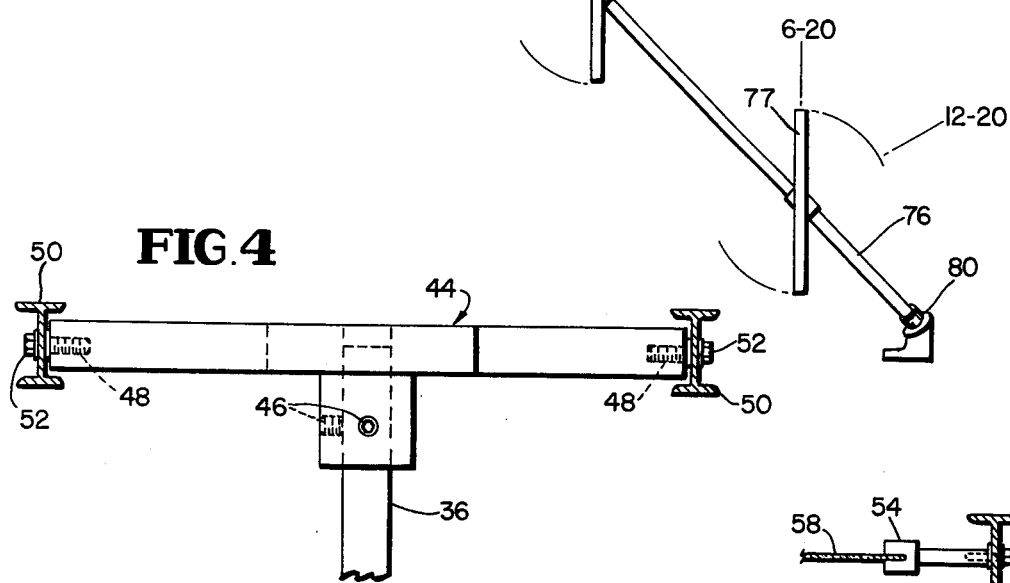
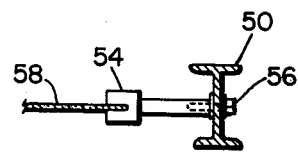
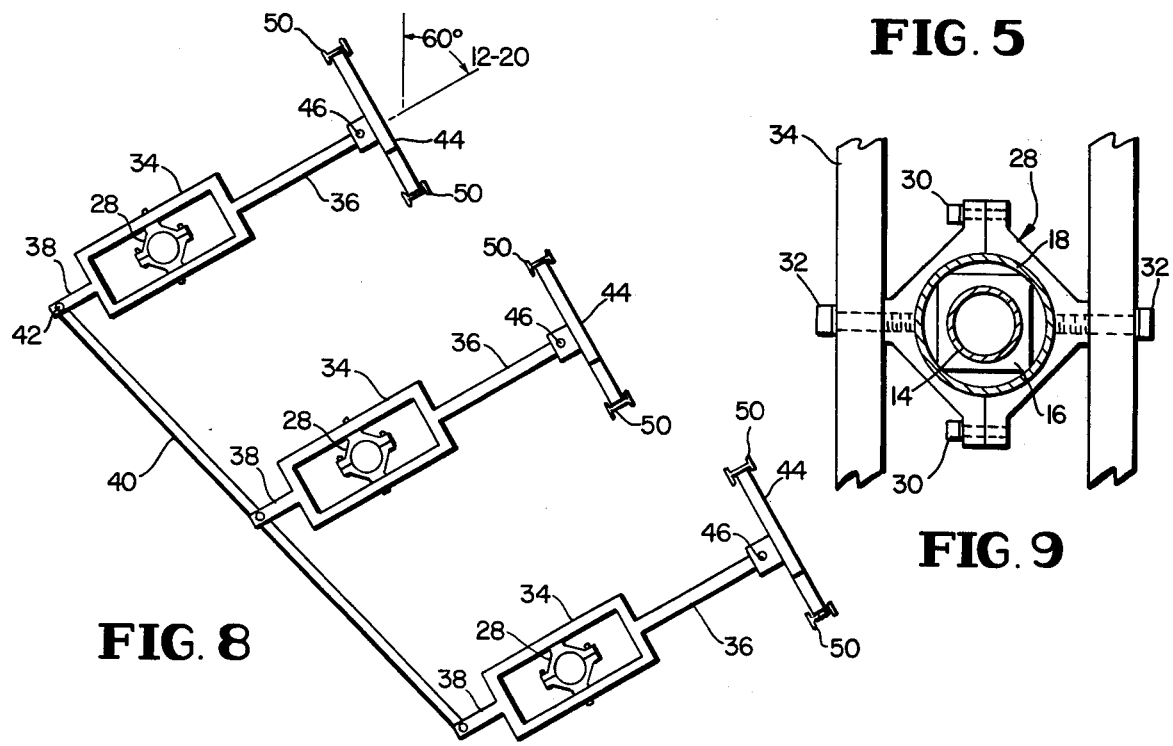

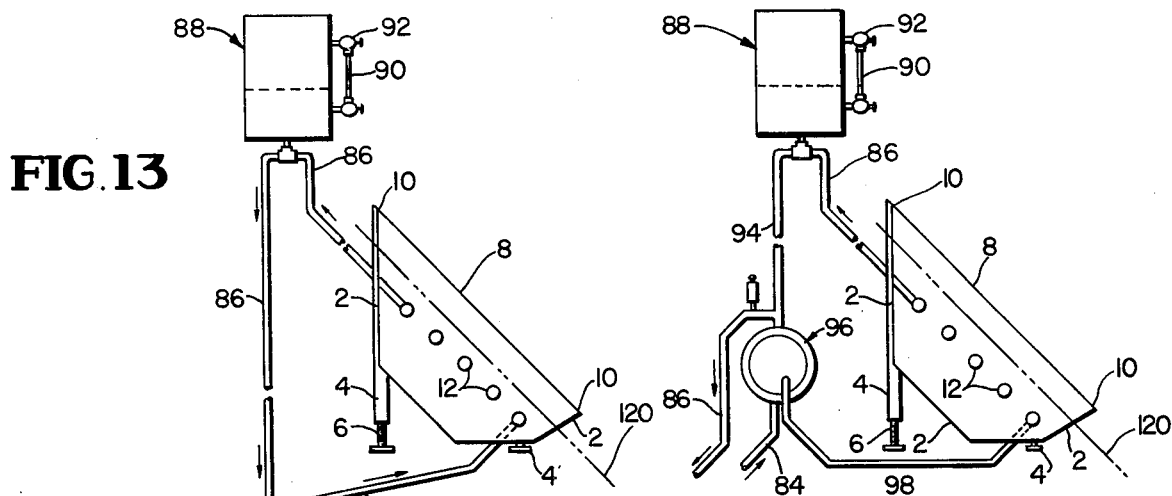
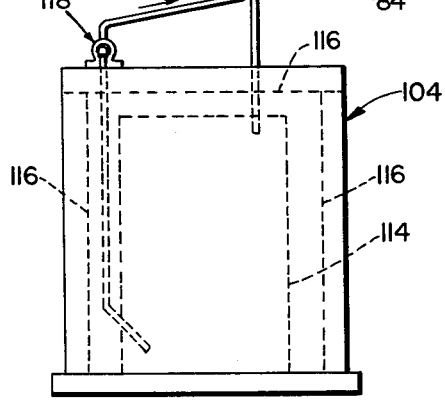
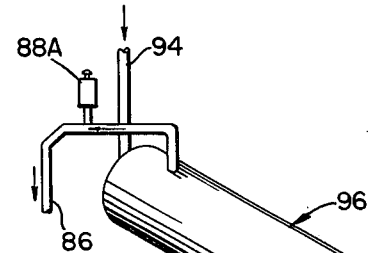
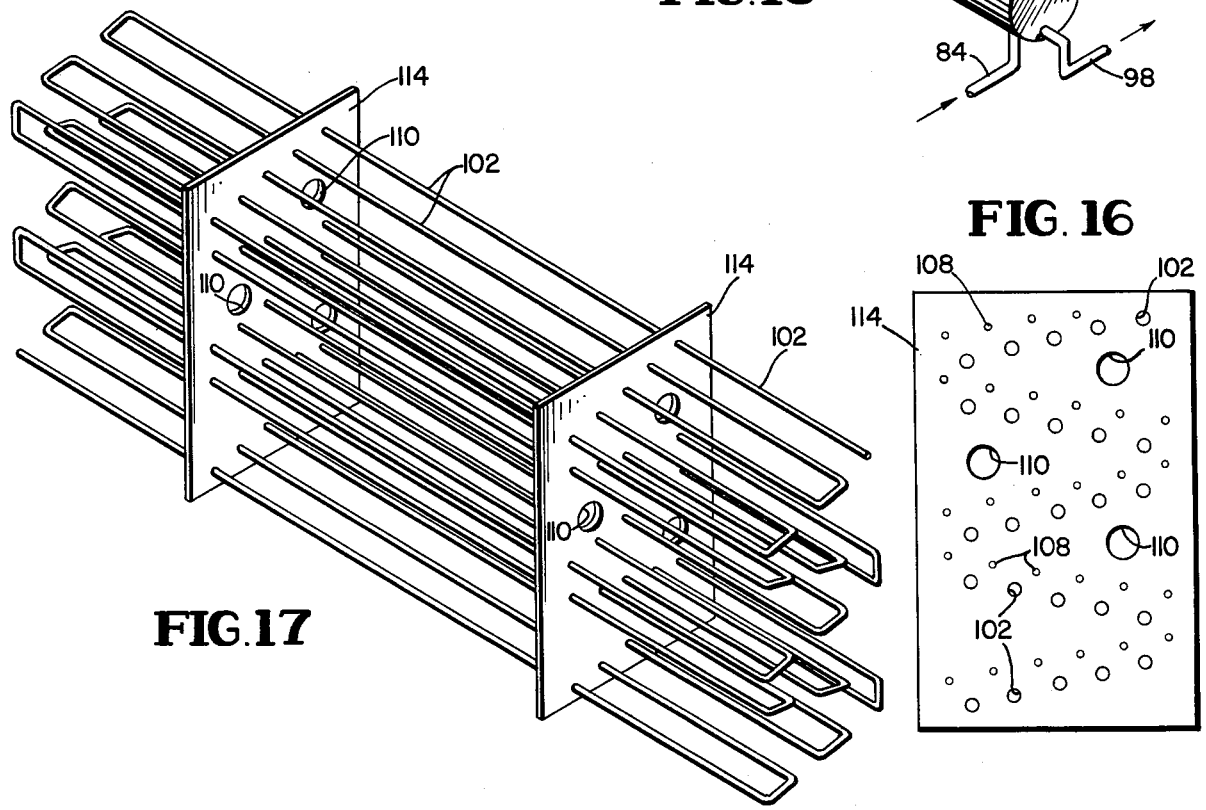

SOLAR ACTUATED BOILER AND APPURTENANCES

GENERAL DESCRIPTION OF THE INVENTION

This invention relates to a solar actuated boiler and more particularly to a solar actuated boiler which magnifies rays of solar energy to precise multiple spots on pre-fabricated manifolds of piping. These manifold pipes are not limited in number and may be assembled in any multiple of rows. The header pipe portion of said manifolds have attached to them, power operated focal oscillators. Operating in complete harmony and unison, the focal oscillators maintained the magnified rays of solar energy on precise points of the manifold headers not only during all sunlight hours (A.M. to P.M.) but additionally they follow precisely the suns path in its' inclination (winter and summer) and declination (summer to winter) continuously. The solar actuated boiler and power operated oscillators, when mounted on the bearing and axle assembly and properly assembled with the paddle and focal adjusters, lens rack and rail, connectors, swivels and magnifying lenses, operate in complete timed unison. The combination of these factors result in the intense heating of the boiler manifolds which contain an aqueous solution. Such heating of said solutions bring about hydrokinetic motion. The manifolds connect through the expansion tank directly into the serpantine coils of a heat storage vault. With the existance of this concentrated solar energy and the resulting hydrokinetic motion the system, depending on topography will continually circulate. Alternate piping, going from the expansion tank to a heat exchanger, would mean that a forced flow circulator would be incorporated from the heat storage vault.

The insert of the heat storage vault consist of properly engineered and ported pipe supports and spacers. The purposes of these supports and spacers are equal distribution of heat, ease of assembly and erection, and simplified mass production. The insert is ported to receive no less than, but not limited to, 3 compatable serpentined coils. One of the coils is connected continuously from the expansion tank and returning to the solar boiler. This coil is used for the convection of the aqueous solution and its accumulated heat and the deposit and storage of that heat within the internal medium of the heat storage vault. The second of these serpentine coils is utilized for the purpose of convecting the Equivalent Direct Radiation (E.D.R.s) to a structure, it is not however limited to a structure. The third coil mentioned would supply domestic hot water, air-conditioning, snow melt or any feasible, assigned function. This insert is placed within a prepared container sufficient to insulate and protect both the insert with coils and the heat storage medium.

A general objective of the subject invention is a substantial reduction in the use of existing fossil fuels. This would be accomplished by no longer requiring those fuels in either their present or projected quantities.

Another object of the subject invention is a reduction, in direct proportion to its' use, of combustible fuel pollutients.

A still further object of the subject invention is a substantial monitary savings to the public.

The noval features which I believe to be characteristic of my invention are set forth with particularity in the appended claims. My invention itself, however, both as to its organization and method of operation, may be best understood by reference to the description taken in conjunction with the accompanying drawings in which:

FIG. 4 is a cross-section taken along lines 4-4 of FIG. 1 showing, paddle and focal adjuster end view of rack and rails with connectors;

FIG. 5 is a cross-section taken along lines 5-5 of FIG. 1 showing lens swivel connected to rack and rail;

FIG. 6 is a schematic view showing multiple actuator assembly;

FIG. 7 is a schematic view of inclination and declination actuator;

FIG. 8 is a schematic view showing the focal oscillator at 12–20 declination;

FIG. 9 is a fragmentary view of the bearing assembly, boss assembly, heat sink pipe, spacer, coupler, axle and spread of the oscillator;

Figure 1:
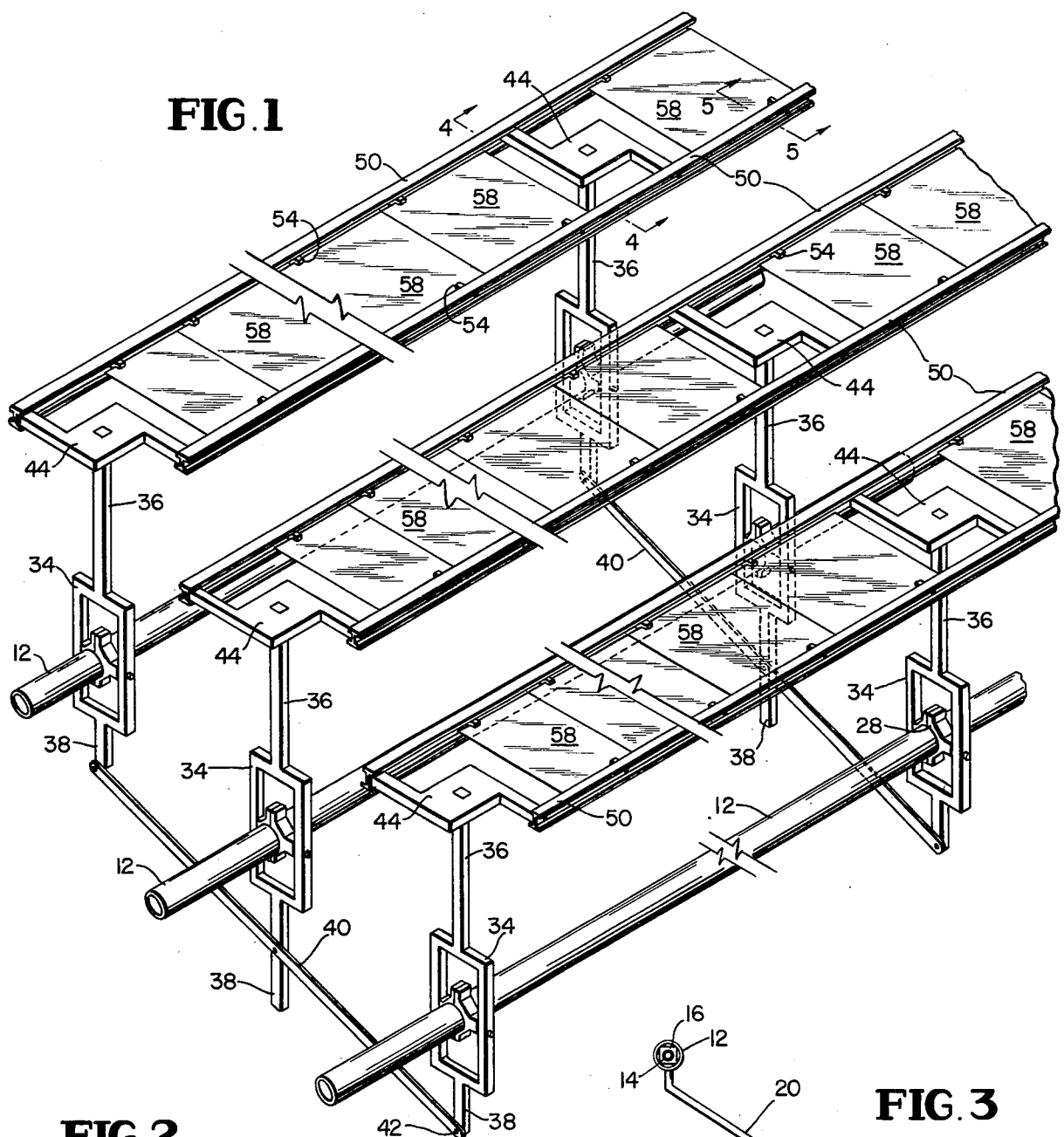
FIG. 1 is a perspective view of the boiler assembly.
Figure 2:
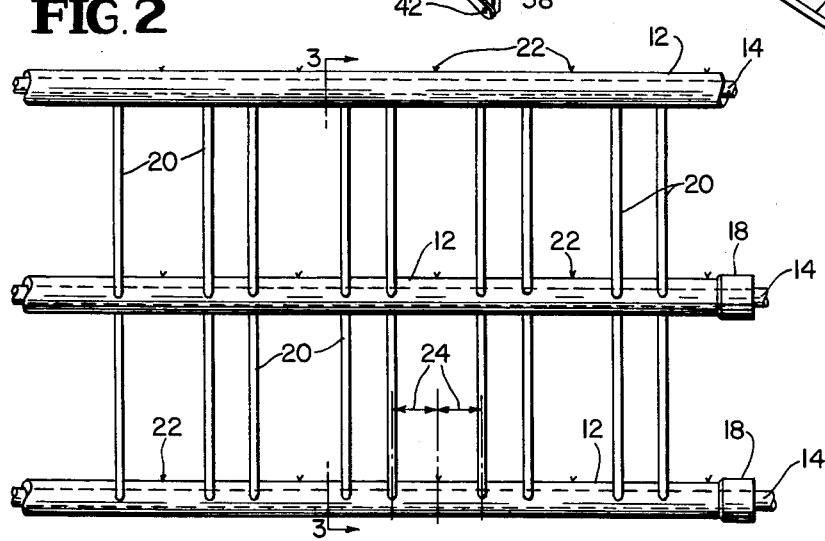
FIG. 2 is a front elevation of a header section and core piping.
Figure 3:
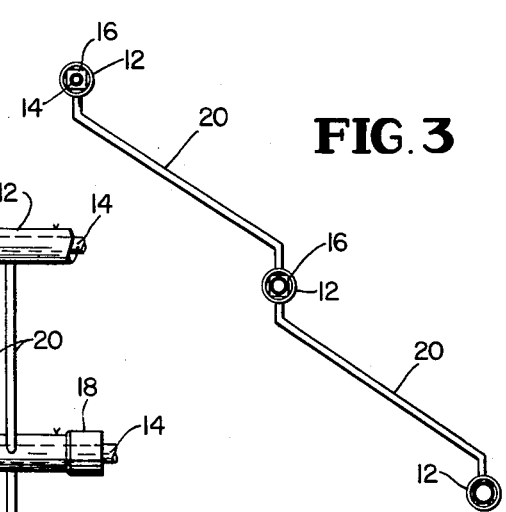
FIG. 3 is a cross-section taken along line 3—3 of FIG. 2 showing core piping connecting header.
Figures 10, 11, 12:
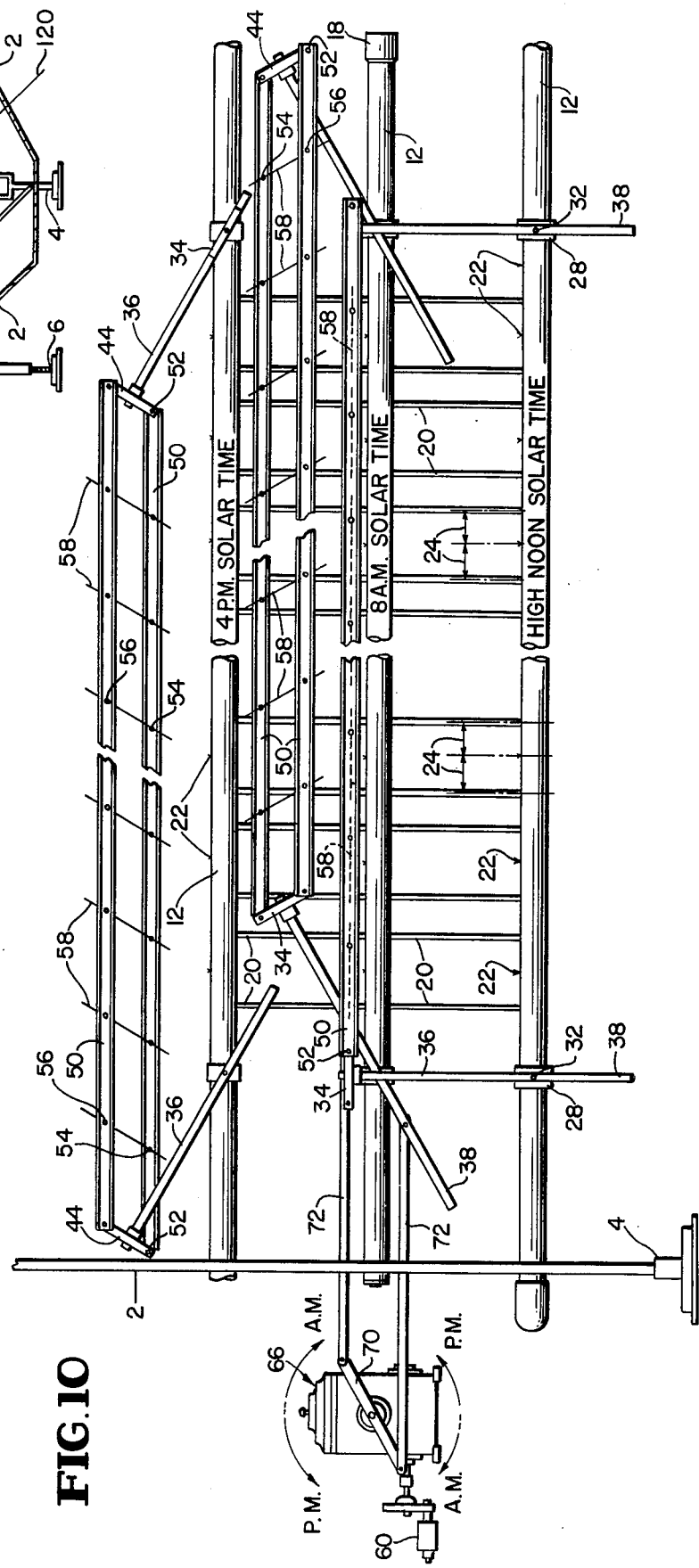

FIG. 10 is a front view of the elevation of the boiler assembly showing:
 a. Lens and focal oscillator at high noon solar time;
 b. Power operator, power unit transmission, actuator crank, connecting arms to focal oscillators, lens rack and rail and lens tilt to 8 a.m. solar time;
 c. Lens and focal oscillator at 4 p.m. solar time;

FIG. 11 is a schematic view of the power unit transmission;

FIG. 12 is a schematic view of the boiler receiver trough with maximum roof insert line or shadow line;

FIG. 13 is a schematic view of the piping diagram and maximum insert or shadow line;

FIG. 14 is a schematic view of alternate piping diagram and maximum insert or shadow line;

FIG. 15 is a schematic view of heat exchanger;

FIG. 16 is an elevation of pipe support and spacer, ported;

FIG. 17 is a perspective view of boiler heated coil.

Referring now to the drawings, the header pipes 12 with their core piping 20 are, for purposes of mass production, made into sections of multiple headers 12. A boiler receiver 2 is properly installed and leveled from true north. At this time the lattitude pitch adjuster 6, a part of the support 4 and the boiler receiver 2, is adjusted to the installed units lattitude. The header pipes 12 are placed into the boiler receiver 2 and assembled by first inserting the loose focal oscillator 34 on the open spigot end of the header pipes 12 and then joining the header pipes 12 together by means of the coupler 18. Next the bearing assembly 28 is cast into two parts which are then placed center on coupler 18 and joined by assembly boss 30. The focal oscillator 34 is slipped into the center position of the bearing assembly 28 and joined to the bearing assembly 28 by axle 32. In the above procedure there is placed on a second pipe, having a dual function of both support and acting as a heat sink 14. Along with support spacer 16 and header piping 12, heat sink 14 extends through the end plates of the boiler receiver 2. In schematic piping diagram, 84 is joined to the header pipes 12 at the lowest point and discharge piping 86 is joined to the header pipes 12 at the boilers highest point. In schematic alternate piping diagram, 98 is joined to the header pipes 12 at the lowest point and discharge piping 86 is joined to the header pipes 12 at the boilers highest point. Now the actuator connecting arms 72 are connected to the focal oscillator 34 and are extended through one end of the boiler receiver 2. The actuator connecting arms 72 are joined to the actuator crank 70 which has been previously assembled to the power transmission unit 66 and power operator 60. When, because of header pipe size and number, it becomes necessary to utalize a combination of actuators, FIG. 6 best illustrates this solution. The power unit transmission 66, after being repositioned, is fitted on the shaft 68 with a universal joint 78. This combination drives a splined shaft 76 supported at one end by a pillow block 80. A bearing assembly 28A with milling to match the splined shaft 76 is attached to splined shaft 76. The #77 is simply a focal oscillator 34 with focal stem 36 and focal oscillator tail 38 removed. Further, FIG. 7 shows power unit transmission 66 with inclination and declination arms 82. Now to continue with assembly. The lens rack and rail 50 are connected to paddle and focal adjuster 44 by means of mounting shoulder screw 52. The magnifying lenses 58 are placed into the lens swivel 54 and attached to the lens rack and rail 50 by mounting shoulder screw 52. When assembly of lenses 58, lens rack and rail 50, with lens swivels 54 are completely connected to the paddle and focal adjusters 44 this assembly is placed atop the focal oscillator stem 36, adjusted and set to the structure focal length of the lenses by set screws 46. The focal oscillator connecting rod 40 is then attached to tail 38 of the focal oscillator 34 by the machined shoulder bolt 42. The power to the actuator 60 is wired and the timing is tested at this point of installation. The safety plate glass cover 8 is then placed and sealed 10 to the boiler receiver 2. Depending on topography and desirability, a heat storage vault 104 is prepared on the site of installation. Pipe support and spacers 114, boiler heated coil 102, radiant coils 108, and domestic coil 110, all pre-assembled, are placed within the heat storage vault 104. The piping 86 connecting with 102, the circulator 118 connecting to 84 complete the piping circuit. The system is filled with its aqueous solution and tested to 300 lbs. p.s.i. After connecting serpentine coil 108 to structure and connecting domestic hot water coil 110 to fixtures the heat storage vault 104 is filled with the heat storage medium, insulated and covered.

While I have shown and described specific embodiments of my invention, it will, of course, be understood that various modifications and alternative constructions may be made without departing from the true spirit and scope of this invention. For this reason I intend, therefore, by the appended claims to cover all such arrangements falling within the true spirit and scope of these claims.

I claim:

1. A solar boiler comprising:
   at least one elongated header pipe, a plurality of ganged, discrete, movable mounted converging lenses adapted to provide a point image positioned adjacent to but spaced from the header pipe with each lense focused thereon to produce an individual and discrete focused point image on the header pipe corresponding to each lense, and tracking means connected to each lense to automatically and synchronously move the lenses through the azimuth to follow a solar body and maintain the focused, concentrated point image of the solar body on the header pipe, whereby the boiler may be maintained in an advantageous configuration for the collection of solar energy on the header pipe by the lenses as the relative position of the solar body and the boiler header pipe change.

2. A solar boiler as set forth in claim 1 in which each focus point for each lense is spaced along the header pipe relative to other such focus points, and the tracking means is adapted to move each converging lense substantially through an arc centered on the fixed image focus point of the corresponding lense on the header pipe, whereby the focus point of each lense remains in a substantially fixed position on the header pipe.

3. A solar boiler as set forth in claim 1 in which the tracking system comprises at least two parallel rails supporting the plurality of converging lenses with each lense being supported at one pivot point on each rail, the pivot points connecting each lense being offset in opposite directions from the center of the lense, a pair of pivot members attached to the rails at pivot points spaced similarly to the pivot points attaching each lense to the rails, an arm member extending perpendicularly from each such pivot member and the arm member further being pivoted around an axis substantially parallel to the plane in which the rails lie, a clockwork mechanism and means for orienting the arms in response to movement of the clockwork mechanism connected to the clockwork mechanism, whereby, the arms may be constantly oriented towards the solar body and, accordingly, the lenses supported between the rails will similarly be oriented towards the solar body.

4. A solar boiler as set forth in claim 3 in which the lenses and supporting rails are also rotatable around an axis perpendicular to the axis around which the member is rotatable, whereby, the angle of inclination of the lenses may be adjusted.

5. A solar boiler as set forth in claim 4 in which the axis around which the angle of inclination is adjusted is substantially concentric with the header pipe.

6. A solar boiler as set forth in claim 3 in which the axis around which the arms are rotatable extend perpendicularly through the header pipe.

7. A solar boiler as set forth in claim 3 in which a plurality of pairs of parallel rails supporting converging lenses are provided with similarly spaced pivot members and arms, with the arms being interconnected by a pivotally attached linkage member to concurrently drive all of the arms.

8. A solar boiler as set forth in claim 1 which further includes a serpentine pipe, an insulated vault, and a heat storage medium, and in which the header pipe is connected to a serpentine pipe housed in an insulated vault, the serpentine pipe being immersed in a heat storage medium, whereby heat from the serpentine pipe may be conducted to the heat storage medium within the vault.

9. A solar boiler as set forth in claim 8 in which at least two additional serpentine pipes independent from and each substantially equally spaced from the first serpentine pipe are included in the vault, whereby heat stored in the storage medium may be conducted from the vault through the additional serpentine pipes.

10. A method of collecting solar energy comprising:
    focusing a group of ganged concentrating lenses on at least one header pipe to define a plurality of image points, automatically moving the lenses synchronously along the azimuth to track a solar body as the solar body moves relative to the header pipe, maintaining a substantially constant distance substantially equal to the focal length of the lense between each lense and the image point of the lense on the header pipe, and maintaining the image point on the header pipe in a substantially fixed position as the lense moves.

* * * * *